United States Patent [19]
Elmendorf et al.

[11] 3,880,687
[45] Apr. 29, 1975

[54] METHOD OF MAKING A WOOD FIBER BOARD HAVING A RELIEF-TEXTURED SURFACE

[75] Inventors: Armin Elmendorf, Portola Valley; Roland Etzold, Mountain View, both of Calif.

[73] Assignee: Armin Elmendorf, Portola Valley, Calif.

[22] Filed: Oct. 4, 1972

[21] Appl. No.: 295,067

[52] U.S. Cl. .............. 156/62.2; 156/153; 161/117; 161/122; 161/125; 161/162; 161/164; 264/113
[51] Int. Cl. ... B29j 5/00; B32b 21/00; B32b 31/32; D21j 1/00; B32b 3/00
[58] Field of Search ........... 161/116, 124, 125, 117, 161/122, 162, 164; 156/153, 62.2; 264/112–113

[56] References Cited
UNITED STATES PATENTS

| | | | |
|---|---|---|---|
| 1,604,236 | 10/1926 | Peters | 161/116 X |
| 1,862,875 | 6/1932 | Weber | 161/116 X |
| 2,316,143 | 4/1943 | Peebles et al. | 264/220 X |
| 2,431,148 | 11/1947 | Stover | 161/116 |
| 2,573,105 | 10/1951 | Lehman | 117/45 |
| 3,083,128 | 3/1963 | Herrington et al. | 161/124 |
| 3,639,200 | 2/1972 | Elmendorf et al. | 161/116 |
| 3,759,775 | 9/1973 | Shepherd | 161/124 X |

*Primary Examiner*—Philip Dier
*Attorney, Agent, or Firm*—Townsend and Townsend

[57] ABSTRACT

In obtaining a texture or a pattern on a wood fiber board by conventional procedures, as by means of a die, high pressures must be used so that the material of which the board is made is compacted and generally made denser and harder in the depressions of the textured surface. In the process of relief-texturing of the present invention the reverse takes place. Hard surfaces are first created in one plane adjacent to softer areas in the same plane. Particles are then removed from the softer areas by abrasive means that pass over both hard and soft areas creating depressions that lie below the plane of the hard areas.

11 Claims, 4 Drawing Figures

METHOD OF MAKING A WOOD FIBER BOARD HAVING A RELIEF-TEXTURED SURFACE

The process of the present invention is referred to as relief-texturing. It provides wood fiber or shaving boards with surfaces that may suggest natural objects ranging from clouds to travertine stone, or objects that can be made by industry having fixed geometric form such as brick or tile. The specific gravity of the body of the board is generally not changed appreciably when a conventional commercial product of the particle board or insulation board type is given a relief-textured surface in accordance with the present invention. Relief-texturing may constitute a step in the manufacture of some boards, or may be added to the surface of the completed board in a separate operation.

In the use of the board of the present invention, it is generally applied to wood framing by nailing. The board must therefore be stiff and resist pressure without serious bending when a force is applied to it between the framing members of a building, and must be comparable to a good wall board in this respect.

The process of the invention is applicable primarily to fiber boards of two types, namely, those designated in commerce as particle boards and those called insulation board. The former consist of wood shavings or other wood particles bonded together under heat and pressure with resin binders, generally of the thermo-setting type. Each manufacturer has his own trade name. The particles may, however, also be bonded with an inorganic cement such as portland cement. Century Board is a well-known product of this type.

In insulation boards little or no binder is used and the fibers are produced by grinding. The fibers may be the individual wood fibers of which the wood is composed or agglomerations of the same called fiber bundles. These are carried in water and deposited on a screen by felting as in the manufacture of paper. The fibers interlock and thereby provide adequate board strength. The thickness of most insulation boards of commerce is generally one-half inch. Celotex is a well-known board of the insulation board type. Having a low density, insulation boards provide some heat insulation.

The specific gravity of particle boards made with resin binders may range from 0.60 to 0.80. The specific gravity of insulation boards is generally below 0.60 and may be as low as 0.30.

In manufacture, the shavings of particle boards may be coated with a synthetic resin by spraying the resin on the shavings in a rotating drum, while they are being agitated or turned over. From 6% to 10% of synthetic resin based on the weight of the shavings is generally used. The coated shavings may be slightly damp to the touch when they are deposited in the form of a mat. This mat is pressed between hot plates to consolidate the particles and to bond them together into board form having the desired specific gravity. When portland cement is used as the binder, the pressing is done at room temperature, and pressure is maintained until the cement has set. From two to three parts of cement based on the weight of the wood is common.

Relief-textured surfaces have hard, flat elevations separated by valleys. The elevations are harder than the body of the board, and lie in the same plane. The valleys lie in a lower plane. They may be flat and smooth, or rough and uneven.

It will be noted that the manufacture of particle boards always involves the use of a binder and that the binder may be cured in a hot press, or, in the case of inorganic binders, that pressing is done at room temperature. Various kinds of particles may be used such as wood shavings, cut by a knife action, or particles produced by fracturing or breaking wood elements as with a saw or hammermill, also referred to as comminuted wood particles. These are generally smaller than shavings and are more readily removed by abrading with a brush than are shavings.

Particle boards, whether made with synthetic resin binders in a hot press, or with an inorganic cement in a cold press, are generally nailed or fastened to wood framing in construction and may span a distance of 12 inches to 24 inches or more. Bending strength or stiffness is therefore important. Shavings are desirable in particle boards because they contribute strength and are generally used, at least in the core.

We shall first describe our method of obtaining a relief-textured surface on particle boards. Experience in the manufacture of particle boards has shown that when the mat of loosely deposited particles coated with a thermo-setting resin is inserted in a hot press, and first subjected to a light pressure inadequate for good compacting and bonding, the thermo-setting binders on the surface particles will be partially cured before full pressure is applied. The action is referred to as pre-curing. Because the surface is not sufficiently hard, the surface particles on which the resin has been pre-cured must be subsequently removed, as by sanding.

In one form of the present invention, pre-curing of the resin on surface particles in restricted areas is deliberately introduced. To achieve pre-curing on restricted areas without pre-curing the resin over the entire board surface, moisture in the form of a spray or drops of water may be introduced in defined limited areas. The resultant mat is then subjected to contact pressure until the resin on the surface fibers that were not moistened has been partially cured and light bonding has been achieved on these areas. The mat is then quickly subjected to full pressure and heat and pressure is maintained for several minutes. The resin on the surface particles that have been moistened, and therefore not pre-cured, will then cure, and these particles will be well bonded. The areas that were moistened will thereby be harder than the pre-cured areas between them. The areas originally dry are then relatively soft. The resultant board leaving the press will therefore contain areas that are hard, where the particles are well bonded, adjacent to areas that are relatively soft. Both areas lie in the same plane. The hard areas are scratch resistant, and the surface particles in the soft areas may be removed by wire brushing, without removing particles in the adjacent hard areas. After wire brushing, the hard areas lie in a plane above the soft areas. The surface has been relief-textured, and lends itself to highlighting.

If the board containing hard and soft areas in the same plane is subjected to abrasion, as by means of a wire brush or by sandblasting, the surface fibers in the soft areas will be removed, leaving elevations that are hard and flat above shallow valleys between the elevations. The entire relief-textured surface may first be painted, as by means of a brush or spray gun, and when this coat has dried, paint may be applied in another shade by means of a roller which will contact only the elevated areas. The original color will thereby be limited to the valleys, and the board is said to have been highlighted.

Differences in hardness in particle boards between defined areas of the surface may also be obtained by depositing a powdered resin through a template or by spraying a resin solution through the same, thereby restricting the area hardened to the areas exposed at the openings of the template. The areas not enriched with resin will be those covered by the elements of the template. After pressing to cure the resin, the surface is abraded, thereby removing particles from the areas not enriched, and so producing a relief-textured surface.

A modification of the technique for obtaining areas of different hardness is to spread a thin layer of fine resin-coated particles on a mat of normally coated particles, the moisture content of the thin layer being inadequate for satisfactory bonding, then introducing moisture on the thin layer in areas selected to be hard. The assembly so made is then pressed under normal pressing conditions whereby hard areas separated by softer areas are produced. From here on, the procedure of abrading is the same as for previously described techniques.

In place of depositing a powdered resin through the openings of a template or spraying a resin solution through the openings, fine comminuted wood particles or mineral granules heavily coated with resin may be added in these areas. The elements of the template keep the enriched particles away from the mat and upon removal of the template together with the particles lying on it, these areas will not be enriched with resin and they remain relatively soft.

In one procedure developed for obtaining large, flat, hard areas containing pits or depressions, small mounds of inert particles such as uncoated wood particles or small mounds of uncoated sand are placed on a smooth metal caul and an appropriate resin or cement that will be hard when set is distributed over the entire surface. Binder-coated wood particles such as shavings are then deposited for the body of the board, after which the assembly is pressed to compact the particles and to cure the resin or set the cement. When the binder or the resin have hardened, the metal caul is removed and the uncoated and unbonded particles are wire brushed out, leaving valleys or pits in a hard surface.

In another procedure applicable to the use of inorganic cements such as portland cement whose setting can be retarded by appropriate retarders, a layer of cement or cement and an inorganic filler such as fine asbestos fibers is spread on a metal caul and a retarder introduced in areas that are to be removed subsequently from the surface before the cement in these areas has set. The cement in the large area free of retarder is allowed to set sufficiently hard so that this surface can be wire brushed without abrading it, thereby removing material in the unset areas, and leaving pits or depressions in a hard surface.

A texture having some resemblance to travertine stone can be obtained by eliminating the binder in small mounds of particles, or by using a retarder in limited areas of a cement asbestos surface, and removing particles from the soft areas.

EXAMPLE 1

Figure 1:
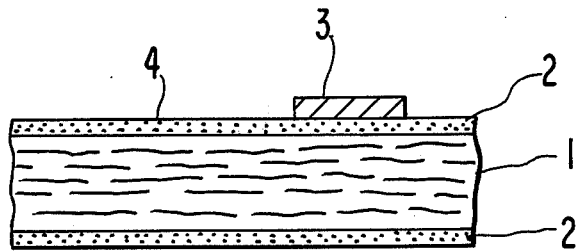
FIG. 1 is a fragmentary, cross-sectional view of one embodiment of the board formed by a pre-curing step with the use of a template.

FIG. 1 shows the method of obtaining relief textured particle boards by means of pre-curing. A mat of wood particles consisting of three layers in which the outer layers are made of comminuted fine particles such as sawdust coated with a thermo-setting resin is first formed on a metal caul by conventional procedure. The middle layer, 1, is made largely of wood shavings to obtain the strength desired. The outer layers, 2, made of comminuted wood particles are preferably made of such particles because they lend themselves to subsequent removal by abrasive means after pre-curing, such as wire brushing or sandblasting. The resin content of the outer layers may also be reduced in limited defined areas in order to introduce comparatively poor bonding there and so to facilitate removal of thin layer of particles from limited areas, as by means of a wire brush.

The core, 1, is preferably made of shavings or strands that have been coated with a thermo-setting resin, the resin content generally ranging from about 4% to 10% based on the weight of the shavings. Layers, 2, are preferably made of comminuted particles, also coated with a thermo-setting resin. 3, shows an element of a template placed over, 2. The exposed space, 4, adjacent to the element of the template may be sprayed with water or dilute resin. The template is then removed so that the areas under the elements of the template present a surface of lower moisture content than the area, 4. The assembly so produced is then inserted in a hot plate press and subjected to contact pressure for about one-half minute, thereby partially curing the resin in the areas previously covered by the elements of the template. Full pressure is then applied for several minutes, thereby compacting the particles throughout the assembly, and fully bonding the surface particles in the moistened areas. The bond of the particles in the pre-cured areas is not as firm as that in the moistened areas. Upon removal from the press the area formerly under the elements of the template and the area, 4, are flush and lie in the same plane. The bond of the particles under the elements of the template is, however, relatively weak on account of pre-curing under contact pressure so that this area is soft while the moistened area is hard.

Figure 4:
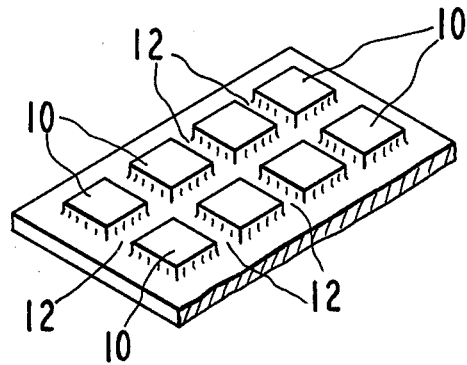
FIG. 4 is a perspective view of a board having a relief-textured surface made in accordance with the invention.

After cooling, the board is subjected to abrasion, as by means of a steel brush, brushing over both the hard and soft areas. This abrasion removes surface particles where the resin has been pre-cured but not the particles in the areas that had been moistened, so that the final panel shows valleys adjacent to hard elevated areas. A typical panel is shown in FIG. 4, wherein a plurality of spaced, relatively hard, raised areas 10 are surrounded by valleys 12. Various patterns can be produced in this manner such as brick or field stone, the pattern being determined by the template. A pigment or dye may be included in the water or dilute resin sprayed on the area, 4.

EXAMPLE 2

Many so-called accidental or chance patterns can also be introduced if the template is eliminated. For cloud-like patterns moisture is introduced in random pattern on the mat surface before the mat goes into the press, the contour of the moistened area being achieved by chance, as when water is dropped on a caul plate and allowed to creep on the plate in random or accidental pattern. From there it is subsequently absorbed in a random pattern by the resin-coated particles spread over the plate. Relief-texture is obtained after pressing, by wire brushing and so removing particles from the dry areas where the resin had been pre-cured.

EXAMPLE 3

Figure 2:
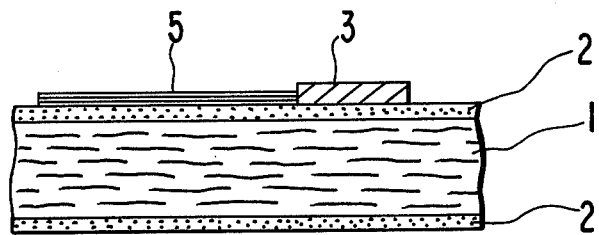
FIG. 2 is a view similar to FIG. 1 but showing another way of forming the board using moisture on a layer of powdered resin.

FIG. 2 illustrates another assembly for carrying out the invention. Sections 1 and 2 are the same as 1 and 2 in Example 1, and 3 shows an element of the template. 5 shows a synthetic resin which may be in the form of a powder, or fine dry particles that are heavily coated with resin. Moisture may then be sprayed on the resin. The resin does not reach the particles under the bars of the template, so that after removing the template and hot pressing, the area, 3, is softer than the area, 5, and particles are readily removed from it with a wire brush.

EXAMPLE 4

Figure 3:
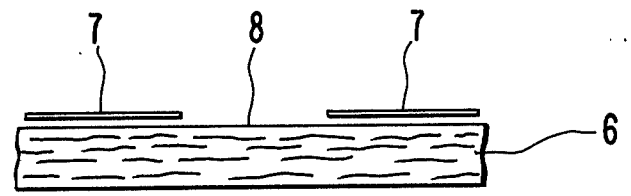
FIG. 3 is a view similar to FIGS. 1 and 2 but showing the way in which a relief textured surface is applied to a previously manufactured board.

FIG. 3 shows a relief-textured wood fiber board, 6, previously manufactured, such as an insulation board, faced on one side with high-density areas, 7, composed of synthetic resins or binders that are readily absorbed by the surface of the board or forced into the board by heat and light pressure.

The areas coated with the binder are restricted as shown in FIG. 3 which shows a narrow zone, 8, between the resin-coated areas, 7. The zone, 8, being part of the body of the board is soft. After wire brushing to remove surface fibers, it lies below the plane of the hardened areas, 7.

Thermo-setting resins such as urea or melamine resin may be used to obtain hardness, and the resin in area 7 may be cured as in a hot plate press using light pressure to avoid crushing the board, but heavy enough to compact and cure the resin in area 7.

Other kinds of binders may be used that require no pressing and are partly absorbed by the surface of the insulation board, such as polyester resins.

It will be noted that the resin used for hardness, whether or not hot pressing is required, may be constrained by fixed borders as by a template to produce a brick or stone pattern. Such patterns are referred to here as geometricl designs. The design may, however, also be produced by accident or chance, as for example, by allowing a resin solution to fall in the form of drops on a metal plate and allowing these drops to spread laterally at liberty so that some drops coalese with neighboring drops and others remaining separated. An insulation board may then be pressed in contact with the liquid resin on the metal plate, whereby the moisture is absorbed by the insulation board and a random or accidental pattern resembling clouds may result. Appropriate wetting agents may be needed to overcome the water resistance of wood fiber boards.

EXAMPLE 5

If portland cement is used as the binder, a relief-textured surface may be obtained by retarding the setting of the cement in limited areas and wire brushing the surface of the board after the cement has been substantially set in the surrounding areas. Various kinds of suitable retarders are commercially available, or ordinary sugar may be used, either granulated or in the form of a solution. A smooth, thin surface layer of portland cement and fine asbestos fiber is preferred, but other fillers such as marble dust may also be used instead of asbestos fibers. In making a particle board of this type the retarder may be printed on a metal caul plate or deposited on the metal through a template of a desired pattern, or randomly deposited. The thin surface layer of cement and filler is deposited on the caul carrying the retarder. This is followed by the cement-coated wood shavings to obtain the thickness desired. The plate with the assembled layers is then subjected to pressure until the cement around the retarded areas has set adequately to prevent abrasion of these areas when wire brushing and to permit wire brushing of the retarded areas, and, hence removal of particles from these areas, thereby to reduce the level of these areas. In the patterns preferred the combined area of the pits or depressions so obtained is less than the flat area surrounding the pits. The setting of the binder may be similarly retarded in limited areas if thermo-setting resins are used, and these areas may be similarly wire brushed to remove particles from the retarded areas.

EXAMPLE 6

In another technique, limited areas that can be brushed out to remove small particles are obtained by providing small blobs of particles that are either not coated with a binder or coated only with a very light binder coat, and depositing these first on a metal plate. Ordinary sawdust, sand, marble dust, or coarse shell flour appropriately moistened and then randomly distributed as blobs or ridges on a metal plate give a non-mechanical pattern when the resultant unbonded blobs are subsequently wire brushed out. When a sieve is used similar to a flour sieve the wet particles pushed through the screen collect on the bottom side of the sieve and when these are heavy enough they fall down on the metal plate in blobs of random uncontrolled size spaced random uncontrolled distances apart. Such results are obtained even though the sieve has openings of uniform size, and the particles are pushed through by a rotor operating at a uniform speed. The method of relief-texturing by depositing blobs or ridges of particles, not coated with a binder, on a metal caul is applicable to the use of binders in the body of the board particles that may be set by eitiher hot pressing or cold pressing. The area that is smooth, flat, and hard is in one plane and preferably exceeds the combined area of the pits or depressions. The uncoated particles such as sand can be readily removed by an ordinary bristle brush. They leave their imprint on the bottom of pits, and a sharp desirable rim is left at each pit. The rough bottom of the pits is attractive, and adds to the texture resembling travertine stone.

Although the foregoing invention has been described in some detail by way of illustration and example, for

We claim:

1. The method of making a relief-textured surface on a wood fiber board comprising the steps of: creating areas on at least one side of the board with the use of initially loose wood particles with certain of such areas being harder than adjacent softer areas and all areas lie in the same plane, abrading the entire surface, thereby removing fibers primarily from the softer areas and keeping the harder areas substantially flat in a plane outwardly of the softer areas.

2. The method of making a wood fiber board having a relief-textured surface comprising the steps of: providing a mat of wood particles coated with a thermosetting resin; pre-curing the resin in certain areas of the surface of the mat on at least one side, consolidating the mat under heat and pressure, thereby creating areas that are harder than adjacent areas and causing all areas to be in the same plane, abrading the entire surface, thereby removing particles at the surface of the pre-cured areas and producing a board having hard areas that lie in a plane outwardly of the adjacent abraded areas.

3. The method as set forth in claim 2, wherein pre-curing is obtained by adding moisture to limited separate areas of the mat, then subjecting the mat to contact hot plate pressure thereby pre-curing the resin in the areas between the moistened areas without appreciably pre-curing the resin in the moistened areas.

4. The method of making a board having a relief-textured surface comprising the steps of: providing a mat of binder-coated wood shavings; creating limited areas of higher binder content on at least one surface of the mat; consolidating the mat under pressure until the binder has hardened, whereby said areas of higher binder content are made harder than the adjacent areas, removing particles at the surface from the areas of lower binder content, thereby producing hard areas that lie in a plane outwardly of valleys.

5. The method as set forth in claim 4, wherein the binder added is in the form of a liquid.

6. The method as set forth in claim 4, wherein the binder added in the areas of higher binder content is in the form of a powder.

7. The method of making a board having a relief-textured surface which consists in, providing a mat of wood shavings coated with portland cement, providing the mat with a surface of cement and a mineral filler having a cement retarder in limited areas of the surface, subjecting the mat and its surfacing to pressure until the cement in the areas without retarder has set, removing the board so formed under pressure, and abrading the entire surface before the cement in the retarded areas has set, thereby removing particles from limited areas in the surface and producing depressions in the cement coat, the bottom of the pits being below the plane of the hard area.

8. The method of making a board having a relief-textured surface which consists in, providing a mat of wood shavings coated with an inorganic cement, providing the mat with a surface layer comprising inorganic cement and a mineral filler, the surface layer containing small masses of particles without a binder, subjecting the mat and its surface layer to pressure until the cement has set, removing the board so formed from pressure, then removing the small masses of particles which contain no binder and thereby creating a surface having pits whose bottom lies below a surface composed of cement and a mineral filler.

9. The method of making a board having a relief-textured surface which consists in, providing a mat of resin coated shavings, providing the mat with a surface of fine resin-coated particles, containing small masses of uncoated particles, allowing the resin to set under heat and pressure, then removing the uncoated masses of particles, thereby creating a surface having pits.

10. The method of making a wood fiber board having a relief-textured surface comprising the steps of, providing a mat of wood particles coated with a thermosetting resin, providing the mat with a thin layer of fine resin coated particles having a moisture content below that necessary for good bonding, adding moisture to limited areas of the thin layer, consolidating the mat under heat and pressure, thereby producing hard and soft areas lying in the same plane, abrading the entire surface, thereby removing particles from the soft areas.

11. The method of making a board having a relief-textured surface which consists in, providing small masses of uncoated particles on a metal plate, forming a mat of wood particles coated with a binder thereon, subjecting the mat and masses of uncoated particles to pressure until the binder has set, removing the board so formed from pressure, then removing the uncoated masses of particles from the surface, thereby creating a surface having pits.

* * * * *